(12) United States Patent
Zhang et al.

(10) Patent No.: US 10,563,545 B2
(45) Date of Patent: Feb. 18, 2020

(54) VALVE LASH DETECTION AND ANALYSIS

(71) Applicant: Caterpillar Inc., Deerfield, IL (US)

(72) Inventors: Yanchai Zhang, Dunlap, IL (US); Zhaoxu Dong, Dunlap, IL (US); Arun Rajendran, Peoria, IL (US); Yifeng Lu, Peoria, IL (US); Xuefei Hu, Dunlap, IL (US); Lidi Chen, Peoria, IL (US); Rodney D. Harms, Houston, TX (US)

(73) Assignee: Caterpillar Inc., Peoria, IL (US)

( * ) Notice: Subject to any disclaimer, the term of this patent is extended or adjusted under 35 U.S.C. 154(b) by 132 days.

(21) Appl. No.: 15/952,578

(22) Filed: Apr. 13, 2018

(65) Prior Publication Data

US 2019/0316496 A1    Oct. 17, 2019

(51) Int. Cl.
| | |
|---|---|
| *F01L 1/34* | (2006.01) |
| *F01L 1/24* | (2006.01) |
| *F02D 41/00* | (2006.01) |
| *G07C 5/08* | (2006.01) |
| *F02D 41/24* | (2006.01) |
| *G07C 5/00* | (2006.01) |

(52) U.S. Cl.
CPC ............. *F01L 1/24* (2013.01); *F02D 41/009* (2013.01); *F02D 41/2409* (2013.01); *G07C 5/008* (2013.01); *G07C 5/0816* (2013.01); *F01L 2201/00* (2013.01); *F02D 2200/101* (2013.01)

(58) Field of Classification Search
CPC ....... F01L 1/24; F01L 2201/00; F02D 41/009; F02D 41/2409; F02D 2200/101; G07C 5/008; G07C 5/0816
See application file for complete search history.

(56) References Cited

U.S. PATENT DOCUMENTS 6,948,461 B1 *   9/2005   Kotwicki ................. F01L 9/04
                                                      123/90.11
2009/0250031 A1   10/2009  Hathaway
2016/0370254 A1   12/2016  Rivellini

FOREIGN PATENT DOCUMENTS

| DE | 3004605 | 10/1987 |
|---|---|---|
| DE | 19529155 | 5/2007 |
| JP | 2004191238 | 7/2004 |
| JP | 2006003309 | 1/2006 |

* cited by examiner

*Primary Examiner* — Zelalem Eshete
(74) *Attorney, Agent, or Firm* — Harrity & Harrity LLP

(57) ABSTRACT

Some examples described herein may involve determining an advance timing window between the valve opening or closing and a designated time that the valve is scheduled to open or close; determining a closing velocity of the valve; monitoring an engine speed of the engine; determining valve lash information based on the advance timing window, the closing velocity, and the engine speed, wherein the valve lash information identifies a magnitude of the valve lash or whether the magnitude of the valve lash associated with the valve satisfies a threshold; and performing an action based on the valve lash information.

20 Claims, 6 Drawing Sheets

VALVE LASH DETECTION AND ANALYSIS

TECHNICAL FIELD

The present disclosure relates generally to monitoring engine valve health and, more particularly, to valve lash detection and analysis.

BACKGROUND

Valve lash is a clearance between a rocker arm and a valve stem of a valve assembly of an engine (e.g., an internal combustion engine (ICE)). Excessive (or abnormal) valve lash can reduce engine efficiency, increase engine vibration, damage valves, and cause other damage to the engine. Accordingly, monitoring valve lash can be useful in avoiding some of the above issues.

One attempt to monitor valve lash is disclosed in U.S. Patent Application Publication No. 2015/0370254 to Rivellini, filed on Jun. 22, 2015 ("the Rivellini reference"). In particular, the Rivellini reference describes a valve timing by deriving a cylinder head acceleration measurement via the vibration signal received by the knock sensor. In the Rivellini reference, the valve timing is monitored by deriving a valve lash based on a vibration signal, an engine crank angle, and a threshold valve lash model.

While the Rivellini reference uses a vibration signal to detect valve lash, the Rivellini reference does not describe features to accurately detect the valve lash and/or a magnitude of the valve lash based on a timing of the valve closing or a velocity associated with the valve closing.

The valve lash detector of the present disclosure solves one or more of the problems set forth above and/or other problems in the art.

SUMMARY

According to some implementations, a device to detect valve lash of a valve of an engine may include one or more processors to: determine an advance timing window between the valve opening or closing and a designated time that the valve is scheduled to open or close; determine a closing velocity of the valve; monitor an engine speed of the engine; determine valve lash information based on the advance timing window, the closing velocity, and the engine speed, wherein the valve lash information identifies a magnitude of the valve lash or whether the magnitude of the valve lash associated with the valve satisfies a threshold; and perform an action based on the valve lash information.

According to some implementations, a system may include a valve sensor; and a valve lash detector to: determine an advance timing window between a valve, of an engine, closing and a designated time that the valve is scheduled to close; determine a closing velocity of the valve based on information received from the valve sensor; monitor an engine speed of the engine; determine valve lash information based on the advance timing window, the closing velocity, and the engine speed, wherein the valve lash information identifies a magnitude of the valve lash or whether the magnitude of the valve lash associated with the valve satisfies a threshold; and perform an action based on the valve lash information.

According to some implementations, a method may include receiving, by a valve lash detector, a position of a crank shaft of a cylinder of an engine; receiving, by the valve lash detector, a schedule indicating when a valve of the cylinder is scheduled to close; determining, by the valve lash detector, an advance timing window between the valve closing and a designated time that the valve is scheduled to close based on the position of the crank shaft and the schedule; determining, by the valve lash detector, a closing velocity of the valve; determining, by the valve lash detector, valve lash information based on the advance timing window, the closing velocity, and an engine speed of the engine, wherein the valve lash information identifies a magnitude of the valve lash or whether the magnitude of the valve lash associated with the valve satisfies a threshold; and performing, by the valve lash detector, an action based on the valve lash information.

DETAILED DESCRIPTION

This disclosure relates to a valve lash detector. The valve lash detector has universal applicability to any machine utilizing an engine that experiences valve lash. The term "machine" may refer to any machine that performs an operation associated with an industry such as, for example, mining, construction, farming, transportation, drilling, hydraulic fracturing (or fracking), or any other industry. As some examples, the machine may be a vehicle, a backhoe loader, a cold planer, a wheel loader, a compactor, a feller buncher, a forest machine, a forwarder, a harvester, an excavator, an industrial loader, a knuckleboom loader, a material handler, a motor grader, a pipelayer, a road reclaimer, a skid steer loader, a skidder, telehandler, a tractor, a dozer, a tractor scraper, or other underground mining or fracking equipment. Moreover, one or more implements may be connected to the machine and/or monitored by the valve lash detector.

Figure 1:
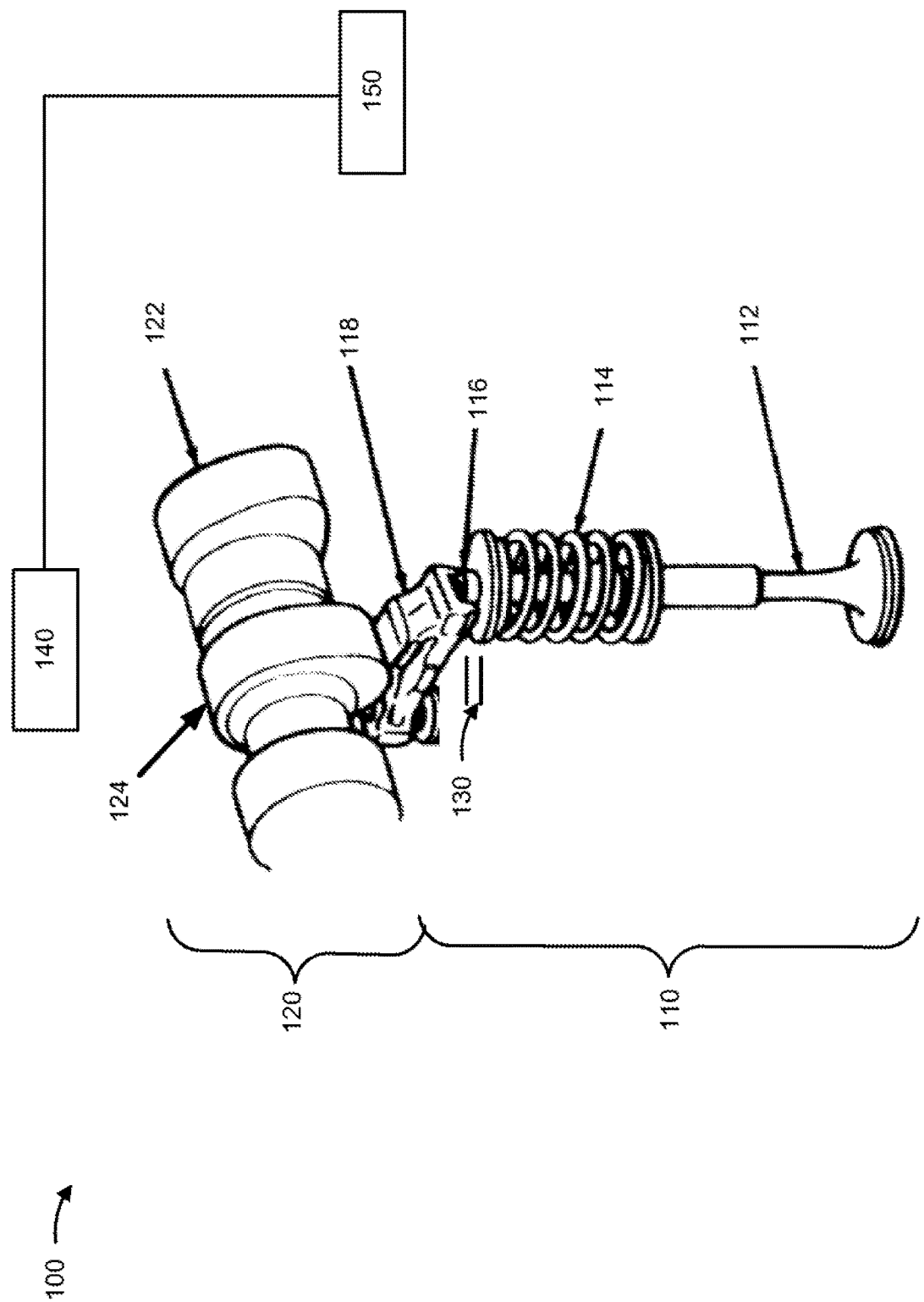
FIG. 1 is a diagram of an example engine assembly of an engine that may be monitored by an example valve lash detector.

FIG. 1 is a diagram of an example engine assembly 100 of an engine that may be monitored by an example valve lash detector. As shown, engine assembly 100 may include a valve assembly 110, a cam assembly 120, a vibration sensor 140, and a valve lash detector 150. The engine assembly 100 may be included within an engine of a fixed or mobile machine that performs some type of operation associated with an industry, such as mining (e.g., fracking), construction, farming, transportation, or the like. For example, the machine may be a fracking pump (or other type of fracking equipment), earth moving machine, such as an excavator, a backhoe, a loader, a motor grader, or the like.

The valve assembly includes a valve 112, a valve spring 114, a valve stem 116, and a rocker arm 118. Valve 112 may be an intake valve or an exhaust valve of a cylinder of an engine. Valve spring 114 may provide some bias or force to open and close valve 112 to allow a flow of a fluid (e.g., air, fuel, or the like) into a combustion chamber of the cylinder. Valve stem 116 may be configured to attach to rocker arm 118 to mechanically provide linear movement of valve 112 based on rotational movement of cam assembly 120. For example, rocker arm 118 may include a cam follower that is placed in contact with cam 124, such that as cam 124 rotates, the cam follower follows the shape of the cam, resulting in rocker arm 118 actuating valve stem 116 and valve 112.

The valve assembly 110 may open and close valve 112 based on rotations of cam assembly 120. Cam assembly 120 includes cam shaft 122 and a cam 124. In some implementations, cam assembly 120 may include a cam for each cylinder of an engine associated with engine assembly 100. As cam shaft 122 rotates, cam 124 may cause the rocker arm 118 to reciprocate, thus causing linearly movement of valve 112 to open and close the valve. Furthermore, as cam shaft 122 rotates, cam 124 may alter a crank shaft angle or crank shaft position associated with a cylinder head of the cylinder to cause the cylinder head to linearly move within the cylinder. Accordingly, cam shaft 122 and/or cam 124 through a same motion may cause mechanical movement of valve 112 and a crank shaft of a cylinder associated with valve 112.

As shown in FIG. 1, valve lash 130 may exist between valve stem 116 and rocker arm 118. Valve lash 130 may increase or decrease in size relative to an original design of engine assembly 100, which can affect overall performance of the engine associated with engine assembly 100. For example, over time, mechanical wear of one or more components of the engine or engine assembly 100 may cause the valve lash 130 to increase or decrease, leading to one or more issues, as described above.

According to some implementations, vibration sensor 140 may sense vibrations associated with valve assembly 110. For example, vibration sensor 140 may provide vibration signals, representative of vibrations caused by movement of valve assembly 110, to valve lash detector 150. The vibration signals may include measurements associated with timing and/or acceleration of a cylinder head (e.g., a piston) of a cylinder of valve assembly 110 and/or a closing velocity of valve 112. The vibration sensor 140 may be situated or placed outside of the cylinder and/or combustion chamber of valve assembly 110. In some implementations, vibration sensor 140 and/or valve lash detector 150 may be assembled as a system to be attached to the engine associated with engine assembly 100 (e.g., as an "aftermarket kit" or as a "replacement part").

Valve lash detector 150 may be in communication with and/or included within an engine control module (ECM) of the engine associated with engine assembly 100. Accordingly, valve lash detector 150 may obtain and/or receive information associated with the engine associated with engine assembly 100 to enable valve lash detector 150 to detect the presence of valve lash 130 and determine a magnitude of the valve lash, as described herein.

As indicated above, FIG. 1 is provided merely as an example. Other examples are possible and may differ from what was described with regard to FIG. 1.

Figure 2:
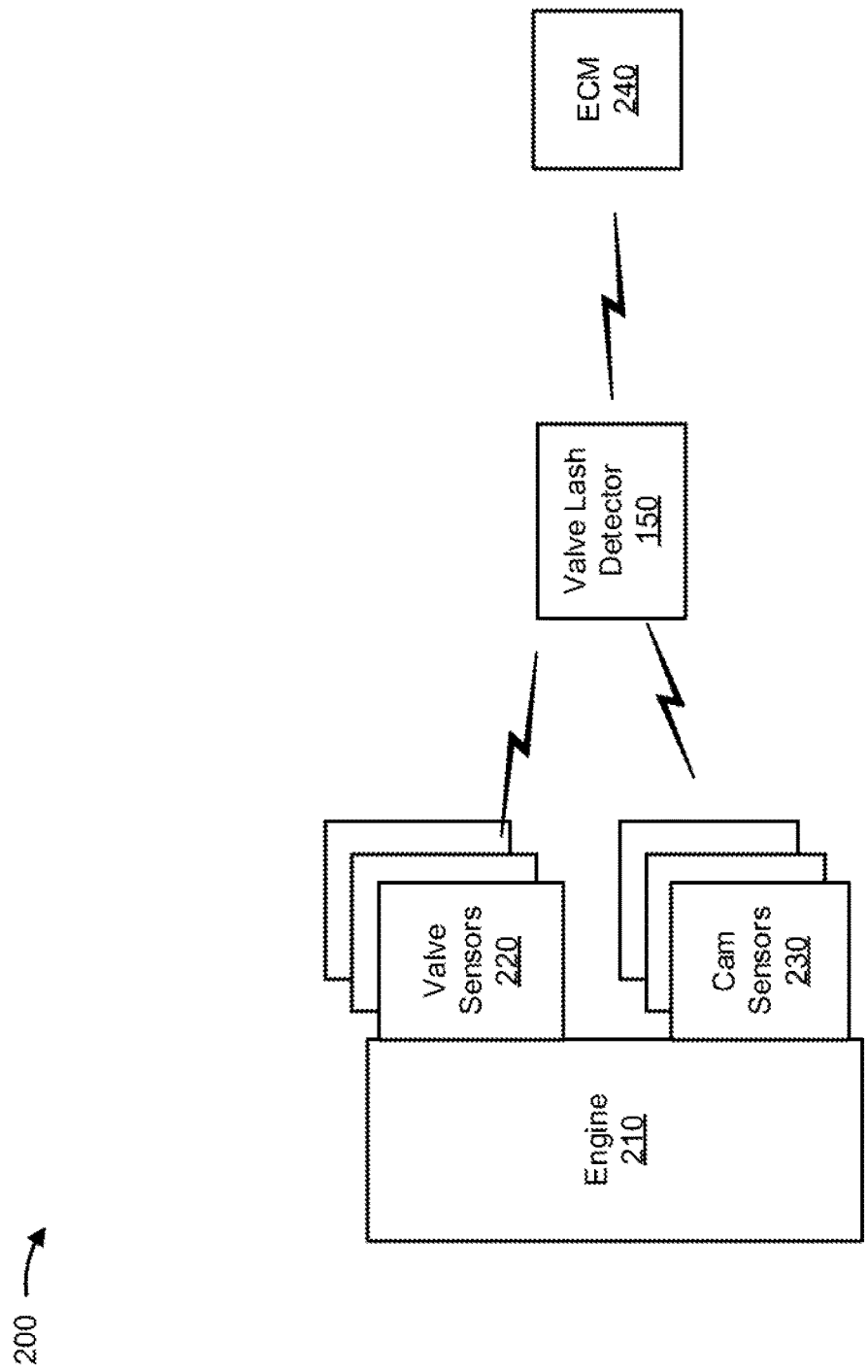
FIG. 2 is a diagram of an example system in which systems and/or methods, described herein, may be implemented.

FIG. 2 is a diagram of an example system 200 in which systems and/or methods, described herein, may be implemented. As shown in FIG. 2 system 200 may include a valve lash detector 150, an engine 210, one or more valve sensors 220 (referred to collectively as "valve sensors 220" and individually as "valve sensor 220"), one or more cam sensors 230 (referred to collectively as "cam sensors 230" and individually as "cam sensor 230"), and an ECM 240. Components of system 200 may interconnect via electrical connections (e.g., wired and/or wireless connections), mechanical connections, or a combination of electrical and mechanical connections. As described herein, system 200 may be a system of, or associated with, a machine.

Valve lash detector 150 may include one or more apparatuses for monitoring one or more components of system 200 to detect and analyze valve lash (e.g., valve lash 130) in engine 210. Valve lash detector 150 is implemented in hardware, firmware, or a combination of hardware and software. Valve lash detector 150 is implemented as a processor, such as a central processing unit (CPU), a graphics processing unit (GPU), an accelerated processing unit (APU), a microprocessor, a microcontroller, a digital signal processor (DSP), a field-programmable gate array (FPGA), an application-specific integrated circuit (ASIC), or another type of processing component. In some implementations, valve lash detector 150 includes one or more processors capable of being programmed to perform a function. In some implementations, one or more memories, including a random access memory (RAM), a read only memory (ROM), and/or another type of dynamic or static storage device (e.g., a flash memory, a magnetic memory, and/or an optical memory) may store information and/or instructions for use by valve lash detector 150.

Valve lash detector 150 may receive one or more inputs from one or more components of system 200 and/or from one or more sensors associated with the components of system 200 and provide an output to ECM 240 based on the one or more inputs. For example, valve lash detector 150 may receive an input signal (e.g., a vibration signal) from one or more valve sensors 220 and/or an input signal (e.g., a crank angle measurement signal) from one or more cam sensors 230 and provide an output signal with valve lash information to ECM 240. In some implementations, a plurality of valve lash detectors 150 may be included within system 200. For example, each of the plurality of valve lash detectors 150 may receive respective input signals from respective valve sensors 220 and/or respective cam sensors 230.

Valve lash detector 150 may detect the presence of valve lash and/or determine a magnitude of the valve lash (e.g., a distance between a rocker arm (e.g., rocker arm 118) and a valve stem (e.g., valve stem 116)) in or more valve assemblies of engine 210. For example, valve lash detector 150 may implement a valve lash model to determine an amount of valve lash based on measurements received from valve sensors 220 and/or cam sensors 230. In such cases, the valve lash model may determine a close timing advance (e.g., an amount of time) between a valve and a cam follower closing (and/or opening) from cam sensors 230, an impact acceleration associated with a valve or cylinder head of the valve from valve sensors 220, and/or an engine speed (e.g. an engine output speed (EOS)) of engine 210. Using the valve lash model, valve lash detector 150 may determine the presence of the valve lash and a magnitude of the valve lash based on the close timing advance and/or based on analysis (e.g., a root mean square (RMS) analysis of the acceleration, a peak-to-peak analysis of the acceleration, a wavelet decomposition associated with the acceleration) at the current speed of engine 210. Accordingly, valve lash detector 150 may be used to automatically detect valve lash and determine a magnitude of the valve lash, in real-time (e.g., as the engine is running).

Engine 210 includes any power source capable of providing power (e.g., mechanical and/or electrical power) to one or more components of a machine. For example, engine 210 may include an internal combustion engine (ICE), such as a gasoline powered engine, a diesel engine, or the like. Additionally, or alternatively, engine 210 may include an electrically powered engine. Accordingly, engine 210 may be a power source of a machine. Engine 210 may include one or more engine assemblies corresponding to engine assembly 100 of FIG. 1.

Valve sensor 220 includes any type of sensor capable of sensing one or more characteristics associated with a valve (e.g., valve 112) of engine 210. Valve sensor 220 may include an accelerometer, a microelectromechanical system (MEMS) sensor, a Hall effect sensor, a magnetoresistive (MR) sensor, and/or any other sensor designed to sense vibration, acceleration, movement and/or a position of the valve.

Cam sensor 230 includes any type of sensor capable of sensing one or more characteristics associated with a cam assembly (e.g., cam assembly 120) of engine 210. Cam sensor 230 may include an accelerometer, a microelectromechanical system (MEMS) sensor, a Hall effect sensor, a magnetoresistive (MR) sensor, and/or any other sensor designed to sense vibration, acceleration, movement, and/or a position of the cam.

ECM 240 may include one or more apparatuses for controlling one or more components of system 200. ECM 240 is implemented in hardware, firmware, or a combination of hardware and software. ECM 240 is implemented as a processor, such as a central processing unit (CPU), a graphics processing unit (GPU), an accelerated processing unit (APU), a microprocessor, a microcontroller, a digital signal processor (DSP), a field-programmable gate array (FPGA), an application-specific integrated circuit (ASIC), or another type of processing component. In some implementations, ECM 240 includes one or more processors capable of being programmed to perform a function. In some implementations, one or more memories, including a random access memory (RAM), a read only memory (ROM), and/or another type of dynamic or static storage device (e.g., a flash memory magnetic memory, and/or an optical memory) may store information and/or instructions for use by ECM 240. In some implementations, ECM 240 may include valve lash detector 150. In other words, one or more of the functions described as being performed by valve lash detector 150 may be performed by ECM 240, or vice versa. In some implementations, valve lash detector 150 may be included within a same chip as ECM 240 or a separate chip as ECM 240.

The number and arrangement of components shown in FIG. 2 are provided as an example. In practice, there may be additional components, fewer components, components, or differently arranged components than those shown in FIG. 2. Furthermore, two or more components shown in FIG. 2 may be implemented within a single component, or a single component shown in FIG. 2 may be implemented as multiple, separate, and/or distributed components. Additionally, or alternatively, a set of components (e.g., one or more components) of system 200 may perform one or more functions described as being performed by another set of components of system 200.

Figure 3:
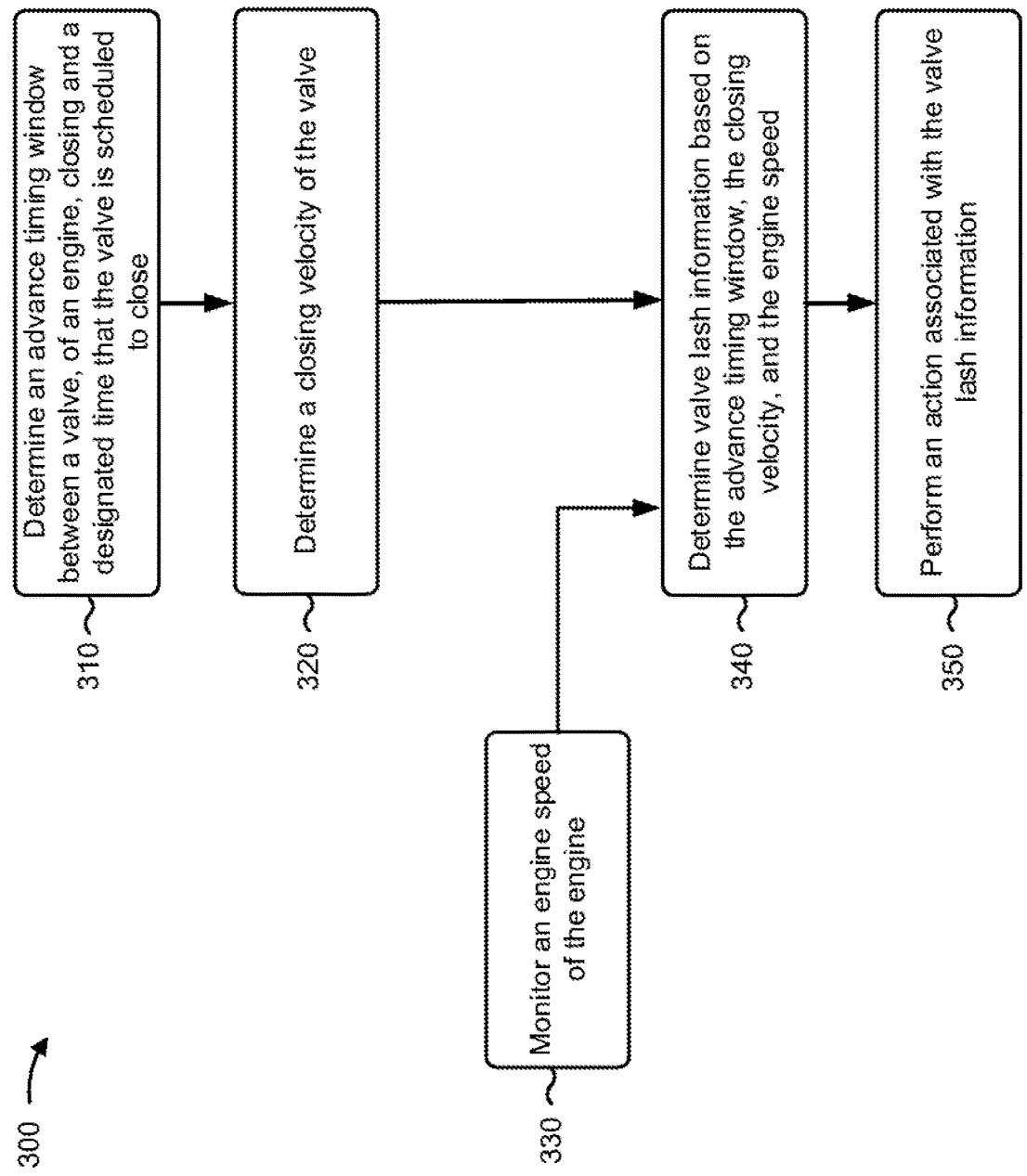
FIG. 3 is a flow chart of an example process associated with valve lash detection and analysis.

FIG. 3 is a flow chart of an example process 300 associated with valve lash detection and analysis. In some implementations, one or more process blocks of FIG. 3 may be performed by valve lash detector 150. In some implementations, one or more process blocks of FIG. 3 may be performed by another component or a group of components separate from or including valve lash detector 150, such as valve sensor 220, cam sensor 230, ECM 240, or the like.

As shown in FIG. 3, process 300 may include determining an advance timing window associated with a valve, of an engine, opening or closing and a designated time that the valve is scheduled to open or close (block 310). For example, valve lash detector 150 may determine the advance timing window between when a valve (e.g. valve 112) of engine 210 is scheduled to close and when the valve closes. In some implementations, valve lash detector 150 may determine the advance timing window based on being powered on, based on being configured to detect the advance timing window, based on receiving a timing schedule associated with the valve closing, based on receiving a timing schedule associated with the valve opening, based on receiving a timing schedule associated with both the valve closing and opening, based on receiving information (e.g., within a vibration signal) indicating the timing of the valve closing and/or opening, or the like.

The advance timing window may correspond to an advance timing window between a cam follower (e.g., a cam follower associated with cam assembly 120) indicating that the valve is to be closed and the valve being closed. Such an advance timing window may be referred to as a "close timing advance." According to some implementations, valve lash detector 150 may determine the timing of the valve opening and/or closing based on information received from valve sensor 220. Additionally, or alternatively, valve lash detector 150 may determine the timing of the valve opening and/or closing based on a crank shaft angle or crank shaft position (and/or a corresponding cam) of the respective cylinder of the valve.

In some implementations, a timing schedule associated with the valve opening and closing may be received and/or stored in a data structure associated with valve lash detector 150. For example, the timing schedule may indicate, based on a position or crank angle of a crank shaft (and/or a cam), of engine 210 when the corresponding valve is to be opened and/or closed. As such, based on a position and/or angle of the crank shaft (e.g., which can be determined using cam sensor 230), valve lash detector 150 may determine the advance timing window. In some implementations, if timing of the opening and/or closing of the valve (e.g., as determined by a crank shaft position, as determined from valve sensor 220, as determined from information from ECM 240, or the like) indicates that the valve is closing early (e.g., relative to a timing schedule), valve lash detector 150 may determine there is valve lash. In some implementations, valve lash detector 150 may use a threshold length of time to determine whether the advance timing window indicates the presence of valve lash. For example, the presence of valve lash may be detected when a size of the valve lash satisfies a particular threshold. Accordingly, though some valve lash may exist (e.g., less than a threshold amount), the presence of valve lash (e.g., abnormal or excessive valve lash) may not be detected unless a threshold amount of valve lash is detected (e.g., equal to or more than the threshold amount). Furthermore, in some implementations, valve lash detector 150 may determine a magnitude of the valve lash based on the length of the advance timing window.

In this way, valve lash detector 150 may determine an advance timing window associated with the valve (e.g., a close timing advance) to permit valve lash detector 150 to detect valve lash associated with the valve and determine a magnitude of the valve lash.

As further shown in FIG. 3, process 300 may include determining a closing velocity of the valve (block 320). For example, valve lash detector 150 may determine the closing velocity of a valve in engine 210. In some implementations, valve lash detector 150 may determine the closing velocity of the valve based on receiving information from valve sensors 220 (e.g., vibration signals and/or vibration information (e.g., vibration magnitude, vibration timing, or the like)), based on determining the advance timing window between the valve closing and a designated time that the valve is scheduled to close, or the like.

In some implementations, valve lash detector 150 may determine the closing velocity of the valve based on determining an acceleration corresponding to the cylinder head. In some implementations, valve lash detector 150 may determine the closing velocity based on calculating one or more of an RMS of the cylinder head acceleration, a peak-to-peak of the cylinder head acceleration, a wavelet decomposition of the cylinder head acceleration, or the like. In some implementations, valve lash detector 150 may determine the closing velocity of the valve based on a time period corresponding to the valve opening and closing. For example, a shorter the time period of the valve closing, the faster the closing velocity determined by valve lash detector 150.

In some implementations, if valve lash detector 150 determines that the closing velocity satisfies a threshold, valve lash detector 150 may determine that valve lash is present. For example, if an RMS of the acceleration exceeds a threshold value, or a peak-to-peak measurement exceeds a threshold value, or if wavelet decomposition indicates the closing velocity exceeds a threshold, valve lash detector may determine that valve lash is present. In such cases, valve lash detector 150 may determine the magnitude of the valve lash corresponding to the engine speed of engine 210.

In this way, valve lash detector 150 may determine the closing velocity of the valve to permit valve lash detector 150 to detect valve lash associated with the valve and determine a magnitude of the valve lash.

As further shown in FIG. 3, process 300 may include monitoring an engine speed of the engine (block 330). For example, valve lash detector 150 may monitor an engine speed of engine 210 using one or more speed sensors.

Engine speed may be an EOS of engine 210. The engine output speed may be determined from one or more sensors (e.g., valve sensors 220, cam sensors 230, speed sensors, and/or other sensors) that indicate the engine speed. In some implementations, valve lash detector 150 may receive the engine speed from ECM 240 (which may be capable of determining and/or monitoring the engine speed using any suitable technique). In some implementations, the engine speed may cause the valve closing velocity to vary even for the same valve lash size. For example, greater engine speeds may cause higher closing velocity while lower engine speeds may cause lower closing velocity.

In this way, valve lash detector 150 may monitor the engine speed to permit valve lash detector 150 to determine valve lash information.

As further shown in FIG. 3, process 300 may include determining valve lash information based on the advance timing window, the closing velocity, and the engine speed (block 340). For example, valve lash detector 150 may determine the valve lash information corresponding to valve lash in engine 210. In some implementations, valve lash detector 150 may determine the valve lash information based on determining the advance timing window, determining the closing velocity, and the engine speed and power information for the ECM, or the like.

Valve lash information may include any information associated with the valve lash. In some implementations, the valve lash information indicates an occurrence of abnormal (or excessive) valve lash (e.g., relative to a threshold). In some implementations, the valve lash information identifies whether a detected valve lash, associated with the valve, satisfies a threshold (e.g., a threshold indicating abnormal or excessive valve lash) and a magnitude of the valve lash. Additionally, or alternatively, the frequency of the valve lash (e.g. how often excessive or abnormal valve lash is occurring), timing associated with the valve lash, or the like.

According to some implementations, valve lash detector 150 may determine a magnitude of valve lash based on one or more mappings of valve lash magnitudes to the advance timing window (e.g., close timing advance), the closing velocity of the valve, and/or the engine speed of engine 210. As such, valve lash detector 150 may store or maintain the one or more mappings in a data structure (e.g., a table, an index, a graph, or the like) associated with valve lash detector 150. Accordingly, valve lash detector 150 may map the advance timing window, the closing velocity, and/or the engine speed to a mapping identifying the magnitude of the valve lash.

In some implementations, the valve lash information can be determined and/or generated using one or more artificial intelligence (AI) techniques. For example, valve lash detector 150 may use an AI engine to develop training data and/or facilitate machine learning associated with determining a presence (or an occurrence) of valve lash and a magnitude of the valve lash. The example AI engine may utilize data processing techniques, deep learning, and/or graphs for machine learning to produce the training data and/or facilitate the machine learning. The example training data may include the one or more mappings of valve lash and/or valve lash magnitudes to close timing advance, closing velocity, and/or engine speed and the machine learning may be facilitated through user feedback (e.g., whether detected valve lash and/or valve lash magnitudes are accurate) and/or self-correction (e.g., whether there is a degradation in performance of engine 210 and/or other engine errors or failures associated with engine 210 that may be caused by the valve lash are detected). Accordingly, valve lash detector 150 may use machine learning to determine the presence of valve lash (or abnormal or excessive valve lash) and magnitude of the valve lash based on previously detected occurrences of valve lash for the valve or engine 210. In some implementations, the AI engine may utilize a Naïve-Bayes classification and/or an artificial neural network to facilitate machine learning.

In this way, valve lash detector 150 may determine valve lash information to permit valve lash detector 150 to perform an action associated with the valve lash information.

As further shown in FIG. 3, process 300 may include performing an action associated with the valve lash information (block 350). For example, valve lash detector 150 may perform the action. In some implementations, valve lash detector 150 may perform the action based on determining the valve lash information, based on determining information in the valve lash information satisfies a threshold, based on detecting an error or failure associated with engine 210 based on the valve lash information, or the like.

In some implementations, valve lash detector 150 may perform an action indicating that valve lash is present and/or the magnitude of the valve lash. For example, valve lash detector 150 may cause an alert to be output (e.g., via a speaker, a display, a vibration mechanism, or the like) via a user interface associated with engine 210 and/or a machine associated with engine 210.

In some implementations, valve lash detector 150 may perform an action including causing a notification (e.g., a message, an email, a text, or the like) to be sent to one or more devices associated with engine 210 and/or an operator of a machine associated with engine 210. Accordingly, valve lash detector 150 may notify remotely located personnel of the presence and/or magnitude of the valve lash.

In some implementations, valve lash detector 150 may perform an action including logging information indicating whether valve lash occurred, when valve lash occurred, an amount of valve lash occurred, and/or the like. Accordingly, a report or log of the information can be referred back to for analysis and/or a diagnosis associated with engine 210.

In some implementations, valve lash detector 150 may cause ECM 240 to control engine 210 to shut down and/or enter a low power mode. In some implementations, valve lash detector 150 may cause ECM 240 (e.g., through providing the valve lash information) to correct or adjust the detected valve lash. For example, based on valve lash information received from valve lash detector 150, ECM 240 may control one or more hydraulic lash adjusters to adjust and/or correct the valve lash (e.g., to remove the valve lash and/or adjust the valve lash to be within a threshold magnitude).

In this way, valve lash detector 150 may perform an action associated with the detected valve lash.

Although FIG. 3 shows example blocks of process 300, in some implementations, process 300 may include additional blocks, fewer blocks, different blocks, or differently arranged blocks than those depicted in FIG. 3. Additionally, or alternatively, two or more of the blocks of process 300 may be performed in parallel.

Figure 4:
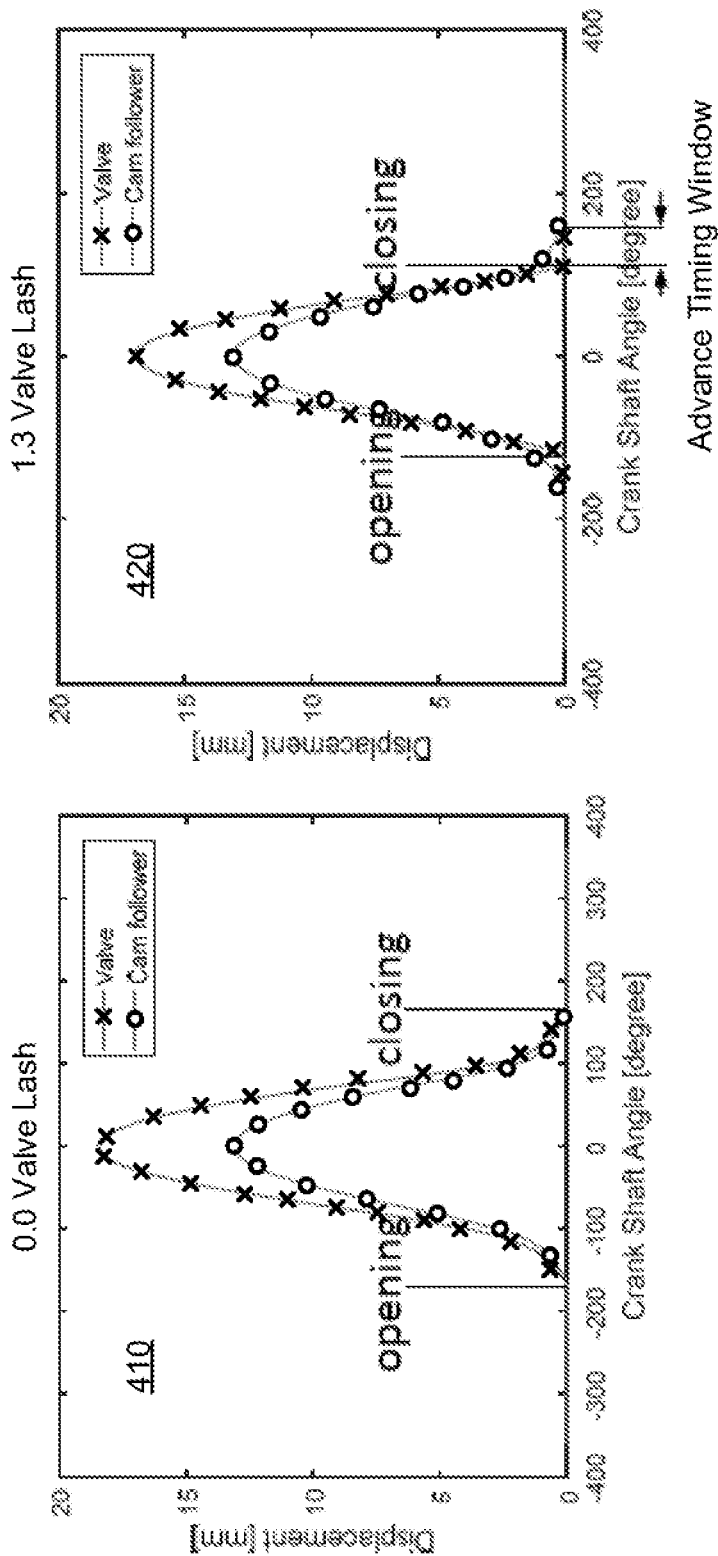
FIGS. 4-6 are diagrams of example implementations relating to the example process shown in FIG. 3.

FIG. 4 is a diagram of an example implementation relating to example process 300 shown in FIG. 3. FIG. 4 shows an example of valve lash detection and analysis. FIG. 4 shows a first graph 410 with zero valve lash and a second graph 420 with a 1.3 millimeter (mm) valve lash (e.g., of a valve of engine 210). As can be seen in graph 410, example measurements indicate that a valve and a cam follower open and close at substantially the same time, thus valve lash detector 150 would not detect any valve lash (0.0 valve lash). Meanwhile, as shown in graph 420, example measurements indicate that an advance timing window ("Close Timing Advanced") is present between the time the valve closes and the cam follower is in a closed position. Accordingly, due to the timing information in graph 420, valve lash detector 150 may detect the presence of valve lash in the valve.

As indicated above, FIG. 4 is provided as an example. Other examples are possible and may differ from what was described with regard to FIG. 4.

Figure 5:
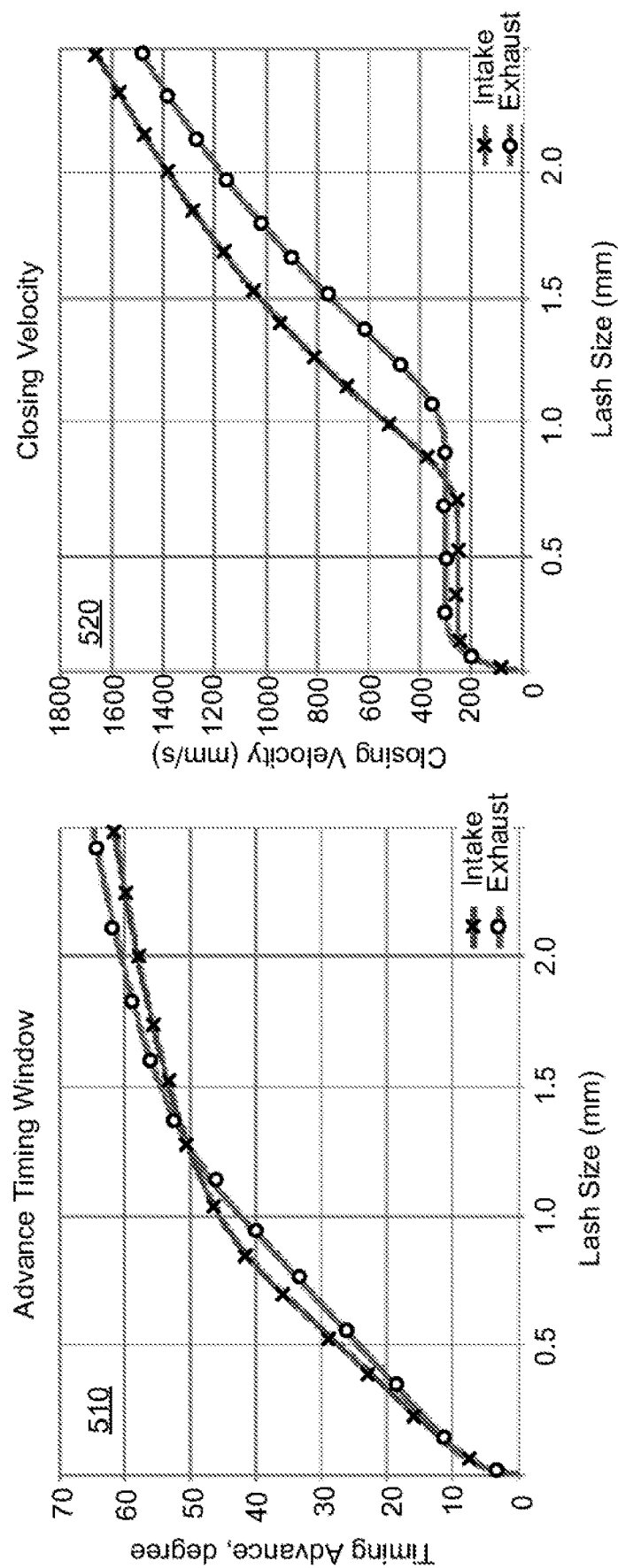

FIG. 5 is a diagram of an example implementation relating to example process 300 shown in FIG. 3. FIG. 5 shows an example of valve lash detection and analysis. FIG. 5 shows a first mapping 510 associated with valve lash and advance timing windows and a second mapping 520 associated with the valve lash and closing velocities. The advance timing windows and closing velocities may be associated with a valve of engine 210. The first mapping 510 and the second mapping 520 indicate magnitudes of valve lash for particular values of close timing advance and closing velocity, respectively, when engine speed of engine 210 is at 1800 revolutions per minute (RPMs). Accordingly, when valve lash detector 150 determines the presence of a valve lash (e.g., due to measuring a closing velocity satisfies a particular valve lash threshold) and the engine speed is 1800 RPMs, valve lash detector 150 may refer to the first mapping 510 and/or the second mapping 520 to determine the magnitude of the valve lash of the valve. In some implementations, the first mapping 510 and second mapping 520 can be combined along with one or more mappings of engine speed to create a three dimensional and/or four dimensional mapping of valve lash corresponding to particular values of advance timing windows, closing velocities, and/or engine speeds.

As indicated above, FIG. 5 is provided as an example. Other examples are possible and may differ from what was described with regard to FIG. 5.

Figure 6:
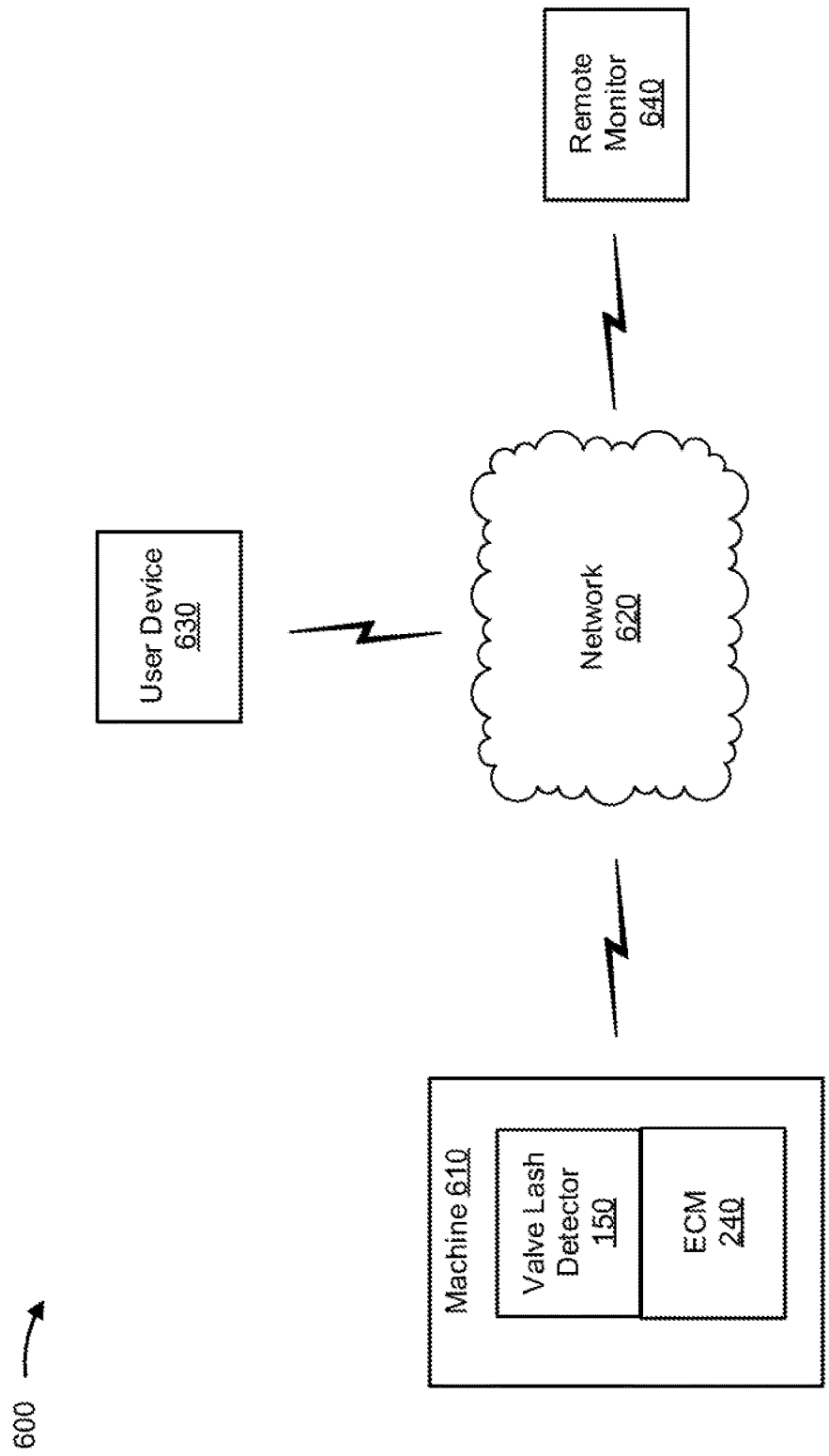

FIG. 6 is a diagram of an example environment 600 in which systems and/or methods, described herein, may be implemented. As shown in FIG. 6, environment 600 may include a machine 610 that includes valve lash detector 150 and ECM 240 (which may correspond to valve lash detector 150 of FIGS. 1 and 2 and ECM 240 of FIG. 2), a network 620, a user device 630, and a remote monitor 640. Devices of environment 600 may interconnect via wired connections, wireless connections, or a combination of wired and wireless connections.

Machine 610 may include any type of machine as described herein. For example, machine 610 may include a vehicle, a backhoe loader, a cold planer, a wheel loader, a compactor, a feller buncher, a forest machine, a forwarder, a harvester, an excavator, an industrial loader, a knuckleboom loader, a material handler, a motor grader, a pipelayer, a road reclaimer, a skid steer loader, as skidder, a telehandler, a tractor, a dozer, a tractor scraper, or other underground mining or fracking equipment.

Machine 610 includes valve lash detector 150 and ECM 240. In some implementations, valve lash detector 150 and/or ECM 240 may include one or more components capable of receiving, generating, storing, processing, and/or providing information associated with valve lash detection. For example, valve lash detector 150 and/or ECM 240 may include a communication component and/or a computing component capable of providing, via network 620, information (e.g., valve lash information) indicating an occurrence or a presence of valve lash and a magnitude of the valve lash to user device 630 and/or remote monitor 640.

Network 620 includes one or more wired and/or wireless networks. For example, network 620 may include a cellular network (e.g., a long-term evolution (LTE) network, a code division multiple access (CDMA) network, a 3G network, a 4G network, a 5G network, another type of next generation network, etc.), a public land mobile network (PLMN), a local area network (LAN), a wide area network (WAN), a metropolitan area network (MAN), a telephone network (e.g., the Public Switched Telephone Network (PSTN)), a private network, an ad hoc network, an intranet, the Internet, a fiber optic-based network, a cloud computing network, or the like, and/or a combination of these or other types of networks.

User device 630 includes one or more devices capable of receiving, generating, storing, processing, and/or providing information associated with valve lash detection and/or valve lash monitoring. For example, user device 630 may include a communication and/or computing device, such as a mobile phone (e.g., a smart phone, a radiotelephone, etc.), a laptop computer, a tablet computer, a handheld computer, a gaming device, a wearable communication device (e.g., a smart wristwatch, a pair of smart eyeglasses, etc.), or a similar type of device. User device 630 may be configured to monitor valve lash associated with machine 610. User device 630 may be located within a building and/or other location remote from machine 610. Accordingly, a user may monitor, via user device 630, valve lash associated with machine 610 from a location other than that of machine 610.

Remote monitor 640 includes one or more devices capable of storing, processing, and/or routing information associated with valve lash detection and/or valve lash monitoring. In some implementations, remote monitor 640 may include a communication interface that allows remote monitor 640 to receive information from and/or transmit information to other devices in environment 600. Remote monitor 640 may be configured to monitor valve lash associated with machine 610. Remote monitor 640 may be located within a building and/or other location remote from machine 610. Accordingly, a user or monitoring device may monitor, via user device 630, valve lash associated with machine 610 from a location other than that of machine 610.

The number and arrangement of devices and networks shown in FIG. 6 are provided as an example. In practice, there may be additional devices and/or networks, fewer devices and/or networks, different devices and/or networks, or differently arranged devices and/or networks than those shown in FIG. 6. Furthermore, two or more devices shown in FIG. 6 may be implemented within a single device, or a single device shown in FIG. 6 may be implemented as multiple, distributed devices. Additionally, or alternatively, a set of devices (e.g., one or more devices) of environment 600 may perform one or more functions described as being performed by another set of devices of environment 600.

Accordingly, a system is provided herein to detect and/or analyze valve lash in an engine.

INDUSTRIAL APPLICABILITY

The disclosed valve lash detector 150 may be used with any machine where proper maintenance and/or operation is desired, such as machines having engines with valves. The disclosed valve lash detector 150 may provide information for determining when valve lash occurs and/or when the health of engine 210 is at risk. Valve lash detector 150 may output information regarding an amount (or magnitude) of the valve lash. Valve lash detector 150 may compare the valve lash to a threshold value, and may determine whether to output an alert based on a result of the comparison. In such cases, resources may be conserved by only outputting valve lash information when the valve lash satisfies a threshold (rather than always outputting valve lash information). Additionally, or alternatively, valve lash detector 150 may perform one or more calculations based on a received signal (e.g., a vibration signal or the like from valve sensor 220 or cam sensor 230), and may determine whether to output the alert based on the one or more calculations. The alert may indicate, to an operator of engine 210 or a machine associated with engine 210, that engine 210 is in need of maintenance, that engine 210 is operating at non-optimal configuration, under non-optimal conditions, or the like. Operation of valve lash detector 150 will now be explained.

During operation of engine 210, one or more valves of cylinders of engine 210 repeatedly open and close. Over time, operation of engine 210 may cause various components of engine 210 to wear down, such as one of the valves, one or more components of a cam assembly, a crank shaft, a cylinder head, or the like. Thus, engine 210 may need maintenance. Proper maintenance may ensure that engine 210 operates effectively during the expected lifetime of engine 210. If maintenance operations are not performed, engine 210 may be subject to repeated failures, premature wearing, and a shortened useful life, which may increase repair costs and/or interrupt normal usage.

In some cases, maintenance of engine 210 may be performed periodically based on a predetermined maintenance schedule. This maintenance schedule may be based on, for example, a predetermined time period, a number of operating hours of engine 210, or the like. However, such a maintenance schedule may not take into account the differences between individual engines 210 (or valves of engines), operating conditions in which engine 210 is used, or the skill level of an operator that uses engine 210. Implementations described herein use real-time, measured performance of engine 210, as indicated by a timing advance window, a closing velocity, and an engine speed, to determine when maintenance should be performed on engine 210 and to provide an indication that such maintenance should be performed.

For example, during operation of engine 210 valve of engine 210 may undergo reciprocating movement due to forces exerted on a cylinder head of a cylinder associated with the valve (e.g., combustion). Such reciprocating movement may also cause a corresponding reciprocating movement of the valve by a rocker arm and/or cam follower, which may be attached to the valve. The reciprocating movement of the valve in engine 210 may cause the rocker arm and the valve to move relative to one another, developing valve lash. Such valve lash may cause damage to engine 210. Valve lash detector 150 may detect the valve lash as the valve lash develops in real-time and prevent further valve lash (e.g., using a hydraulic lash adjuster) and/or by alerting an operator of the engine 210.

In some implementations, valve lash detector 150 may receive information indicative of an advance timing window, a closing velocity, or an engine speed and may output information that assists an operator of a machine associated with engine 210 with determining whether to perform maintenance on engine 210. For example, valve lash detector 150 may provide information that identities the valve lash to a user interface of the machine, to user device 630, to remote monitor 640, or the like. Such devices may display information that identifies the presence and/or a magnitude of the valve lash. An operator may observe the information, and may determine, as engine 210 is being operated, whether engine 210 needs maintenance.

Additionally, or alternatively, valve lash detector 150 may determine whether to provide a maintenance alert based on the valve lash. For example, valve lash detector 150 may compare values corresponding to the valve lash to a threshold value. If the valve lash value satisfies the threshold value (e.g., is less than or equal to the threshold value, indicating that engine 210 needs maintenance), then valve lash detector 150 may output a maintenance alert. The maintenance alert may be provided, for example, to a user interface of the machine, to user device 630, to remote monitor 640, or the like, which may output the maintenance alert as a visible signal, an audible signal, a vibration signal, or the like. In this way, an operator may be alerted as to the need for maintenance, and may take appropriate action in real-time, as engine 210 is being operated.

In some implementations, valve lash detector 150 may perform a calculation using a plurality of closing velocity values received from valve sensor 220. Valve lash detector 150 may use the resulting calculated value to determine whether to provide a maintenance alert. For example, the calculated value may represent an RMS value, a peak-to-peak value, a wavelet decomposition value, or the like, and valve lash detector 150 may compare the RMS value, peak-to-peak value, and/or wavelet decomposition value to a threshold value, as described above. Based on one or more of these comparisons, valve lash detector 150 may provide a maintenance alert to a user interface of the machine, to user device 630, to remote monitor 640, or the like. In this way, an operator may be alerted as to the need for maintenance, and may take appropriate action.

Several advantages may be associated with the disclosed valve lash detector 150. For example, valve lash detector 150 may communicate with ECM 240 and/or a user interface of the machine, to user device 630, to remote monitor 640, or the like, via a wired or wireless connection. In this way, valve lash detector 150 disclosed herein may reliably and effectively communicate valve lash information associated with engine 210. Furthermore, an operator of engine 210 may be notified in real-time (e.g., as engine 210 is being operated) when engine 210 needs maintenance. This may prevent further wear on engine 210 and/or may prevent catastrophic failure of engine, resulting in conservation of hardware resources that may be consumed to replace damaged parts of engine 210 and/or replace engine 210 completely.

Still farther, valve lash detector 150 may more accurately indicate a need for maintenance than a traditional maintenance schedule. Using an advance timing window and closing velocity at a particular engine speed as indicators of valve lash takes into account the extent of the valve lash in engine 210, which is more difficult to take into account using a traditional maintenance schedule or an operator's experience. In some cases, engine 210 may be seriously damaged, and detecting the valve lash may permit engine 210 to be repaired. In this case, engine 210 may be damaged beyond repair if maintenance is only performed at regularly scheduled intervals. Thus, valve lash detector 150 may increase the likelihood that maintenance of engine 210 is performed at appropriate times with increased accuracy and reduced cost.

As used herein, the term component is intended to be broadly construed as hardware, firmware, or a combination of hardware and software.

Some implementations are described herein in connection with thresholds. As used herein, satisfying a threshold may refer to a value being greater than the threshold, more than the threshold, higher than the threshold, greater than or equal to the threshold, less than the threshold, fewer than the threshold, lower than the threshold, less than or equal to the threshold, equal to the threshold, or the like.

As used herein, the articles "a" and "an" are intended to include one or more items, and may be used interchangeably with "one or more." Also, as used herein, the terms "has," "have," "having," or the like are intended to be open-ended terms. Further, the phrase "based on" is intended to mean "based, at least in part, on."

The foregoing disclosure provides illustration and description, but is not intended to be exhaustive or to limit the implementations to the precise form disclosed. Modifications and variations are possible in light of the above disclosure or may be acquired from practice of the implementations. It is intended that the specification be considered as an example only, with a true scope of the disclosure being indicated by the following claims and their equivalents. Even though particular combinations of features are recited in the claims and/or disclosed in the specification, these combinations are not intended to limit the disclosure of possible implementations. Although each dependent claim listed below may directly depend on only one claim, the disclosure of possible implementations includes each dependent claim in combination with every other claim in the claim set.

What is claimed is:

1. A device to detect valve lash of a valve of an engine, the device comprising:
   one or more processors to:
   determine an advance timing window between the valve opening or closing and a designated time that the valve is scheduled to open or close;
   determine a closing velocity of the valve;
   monitor an engine speed of the engine;
   determine valve lash information based on the advance timing window the closing velocity, and the engine speed,
      wherein the valve lash information identifies a magnitude of the valve lash or whether the magnitude of the valve lash associated with the valve satisfies a threshold; and
   perform an action based on the valve lash information.

2. The device of claim 1, wherein the one or more processors, when determining the advance timing window, are to:
   determine timing associated with a crank shaft of a cylinder of the engine, wherein the valve is configured to allow a fluid to flow in or out of the cylinder; and
   determine the advance timing window based on the timing associated with the crank shaft.

3. The device of claim 1, wherein the one or more processors, when determining the closing velocity, are to:
   obtain an acceleration measurement associated with a cylinder head of a cylinder from a valve sensor associated with the valve,
      wherein the valve allows a fluid to flow in or out of the cylinder;
   calculate at least one of a root mean square (RMS) from the acceleration measurement, a peak-to-peak value from the acceleration measurement, or a wavelet decomposition from the acceleration measurement; and
   determine the closing velocity based on at least one of the RMS, the peak-to-peak value, or the wavelet decomposition.

4. The device of claim 1, wherein the one or more processors, when determining the valve lash information, are to:
   use the advance timing window, the closing velocity, and the engine speed to a mapping identifying the magnitude of the valve lash.

5. The device of claim 1, wherein the one or more processors are further to:
   utilize machine learning to determine the magnitude of the valve lash based on previously detected occurrences of valve lash associated with the valve.

6. The device of claim 1, wherein the one or more processors, when performing the action, are to:
   send an alert to a user interface of a machine associated with the engine,
      wherein the alert indicates an occurrence of abnormal valve lash associated with the valve lash.

7. The device of claim 1, wherein the one or more processors, when performing the action, are to:
   cause an engine control module (ECM) to adjust the valve lash of the valve via a hydraulic lash adjuster.

8. A system comprising:
   a valve sensor; and
   a valve lash detector to:
   determine an advance timing window between a valve, of an engine, closing and a designated time that the valve is scheduled to close;
   determine a closing velocity of the valve based on information received from the valve sensor;
   monitor an engine speed of the engine;

determine valve lash information based on the advance timing window, the closing velocity, and the engine speed,
  wherein the valve lash information identifies a magnitude of the valve lash or whether the magnitude of the valve lash associated with the valve satisfies a threshold; and
perform an action based on the valve lash information.

9. The system of claim 8, further comprising:
a cam sensor to determine a position of a crank shaft of a cylinder,
  wherein the valve allows fluid to flow in or out of the cylinder, and
  wherein the valve lash detector is to determine the advance timing window based on the position of the crank shaft.

10. The system of claim 8, wherein the valve lash detector, when determining the closing velocity, is to:
obtain an acceleration measurement associated with a cylinder head of a cylinder from the valve sensor associated with the valve,
  wherein the valve allows a fluid to flow in or out of the cylinder;
calculate at least one of a root mean square (RMS) from the acceleration measurement, a peak-to-peak value from the acceleration measurement, or a wavelet decomposition from the acceleration measurement; and
determine the closing velocity based on at least one of the RMS, the peak-to-peak value, or the wavelet decomposition.

11. The system of claim 8, wherein the valve lash detector, when determining the valve lash information, is to:
use at least one of the advance timing window, the closing velocity, or the engine speed to a mapping identifying the magnitude of the valve lash.

12. The system of claim 8, wherein the valve lash detector, when performing the action, is to:
cause a notification to be provided to at least one of visibly or audibly indicate an occurrence of the valve lash.

13. The system of claim 8, further comprising
a communication device,
  wherein the valve lash detector, when performing the action, is to transmit the valve lash information, via the communication device and a network, to a device that is located remotely from the engine.

14. The system of claim 8, wherein the valve sensor comprises a vibration sensor.

15. A method comprising:
receiving, by a valve lash detector, a position of a crank shaft of a cylinder of an engine;
receiving, by the valve lash detector, a schedule indicating when a valve of the cylinder is scheduled to close;
determining, by the valve lash detector, an advance timing window between the valve closing and a designated time that the valve is scheduled to close based on the position of the crank shaft and the schedule;
determining, by the valve lash detector, a closing velocity of the valve;
determining, by the valve lash detector, valve lash information based on the advance timing window, the closing velocity, and an engine speed of the engine,
  wherein the valve lash information identifies a magnitude of the valve lash or whether the magnitude of the valve lash associated with the valve satisfies a threshold; and
performing, by the valve lash detector, an action based on the valve lash information.

16. The method of claim 15, wherein determining the closing velocity comprises:
obtaining an acceleration measurement associated with a cylinder head of a cylinder from a valve sensor associated with the valve,
  wherein the valve allows a fluid to flow in or out of the cylinder;
calculating at least one of a root mean square (RMS) from the acceleration measurement, a peak-to-peak value from the acceleration measurement, or a wavelet decomposition from the acceleration measurement; and
determining the closing velocity based on at least one of the RMS, the peak-to-peak value, or the wavelet decomposition.

17. The method of claim 15, wherein determining the valve lash information comprises:
using a mapping associated with the advance timing window, the closing velocity, and the engine speed to identify the magnitude of the valve lash.

18. The method of claim 15, further comprising:
utilizing machine learning to determine the magnitude of the valve lash based on previously detected occurrences of valve lash associated with the valve.

19. The method of claim 15, wherein performing the action comprises at least one of:
sending an alert to a user interface of a machine associated with the engine,
  wherein the alert indicates the magnitude of the valve lash, or
transmitting the valve lash information, via a network, to a device that is located remotely from the engine.

20. The method of claim 15, wherein performing the action comprises:
causing an engine control module (ECM) to adjust the valve lash of the valve via a hydraulic lash adjuster.

* * * * *